REYNOLDS & CLARK.
Coffee Pot.
No. 88,076.  Patented March 23, 1869.
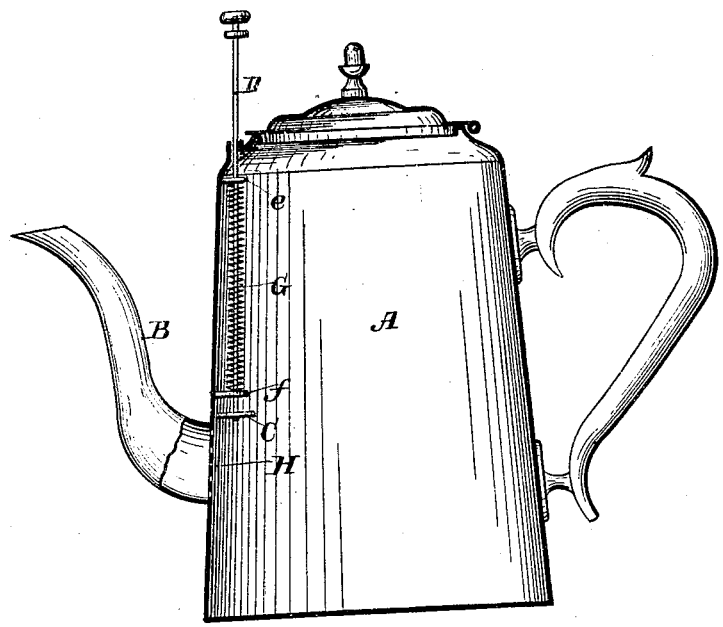
Witnesses:
Chas. Nith
Wm. A. Morgan
Inventors:
C. H. Reynolds
G. J. Clark
per Munn & Co.
Attorneys.

C. H. REYNOLDS AND GEORGE Z. CLARK, OF CROTON FALLS, NEW YORK.

Letters Patent No. 88,076, dated March 23, 1869.

---

IMPROVEMENT IN TEAPOTS.

---

The Schedule referred to in these Letters Patent and making part of the same.

---

*To all whom it may concern:*

Be it known that we, C. H. REYNOLDS and GEORGE Z. CLARK, of Croton Falls, in the county of Westchester, and State of New York, have invented a new and useful Improvement in Teapots; and we do hereby declare that the following is a full, clear, and exact description thereof, which will enable others skilled in the art to make and use the same, reference being had to the accompanying drawing, forming part of this specification.

The object of this invention is to provide means for removing the leaves of tea from the entrance to the spout of the teapot; and It consists in arranging a spring scraper in the inside of the pot, as hereinafter described.

The drawing represents a vertical section of teapot provided with one of our scrapers.

A is the teapot;

B is the spout; and

C represents the scraper.

The scraper is attached to a rod, D, which passes down into the teapot from the top, as seen in the drawing.

*e* is a collar on the rod.

*f* is a bracket, fast to the inside of the pot, through which the rod passes.

G is a spiral spring around the rod, which is confined between the collar *e* and the bracket *f*.

When the rod is forced down, the scraper C will remove any tea-leaves or obstructions from the base, H, of the spout, and the recoil of the spring will immediately raise the scraper to the position seen in the drawing, above the perforation in the base of the spout.

*i* is a knob on the top of the rod D.

When the flow of the liquid is obstructed by the leaves, it is only necessary to push down the rod, and the obstruction is instantly removed, as the scraper is designed to rest in contact with the inside surface of the teapot, at the base of the spout.

The advantages of this arrangement will be readily understood and appreciated by all.

Having thus described our invention,

We claim as new, and desire to secure by Letters Patent—

In combination with a teapot, the scraper C, or its equivalent, arranged and operated substantially as and for the purposes herein shown and described.

C. H. REYNOLDS.
GEORGE Z. CLARK.

Witnesses:
ODLE CLOSE,
J. W. KEELER.